LUMPED PARAMETER DIRECTIONAL COUPLER
Filed Feb. 15, 1966
FIG. 1
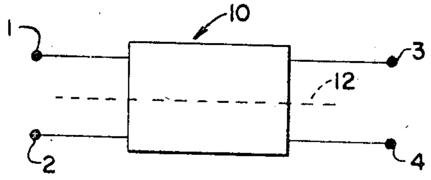
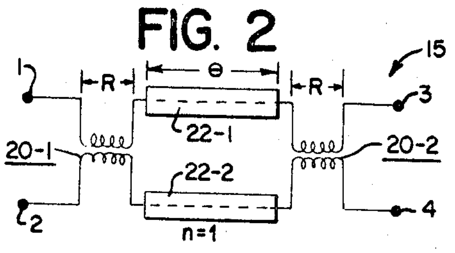
FIG. 3A
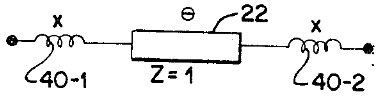
FIG. 3B
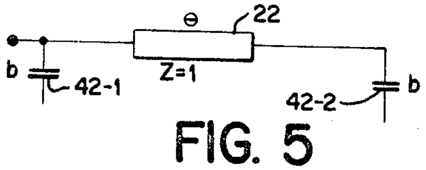
FIG. 4
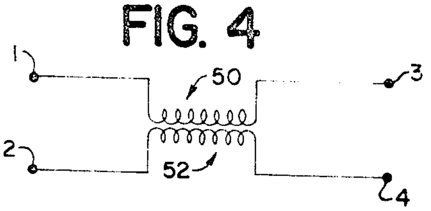
FIG. 5
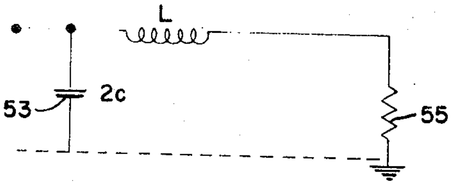
FIG. 6A
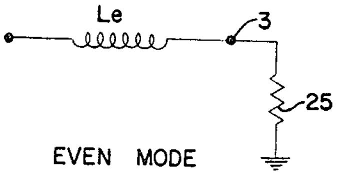
FIG. 6B
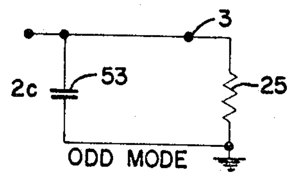
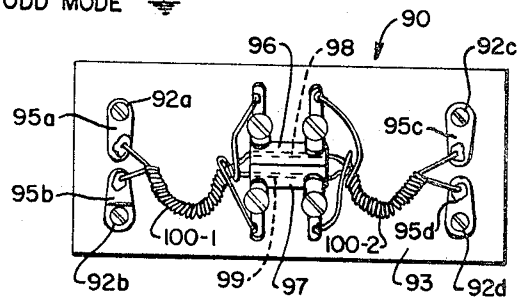
FIG. 8
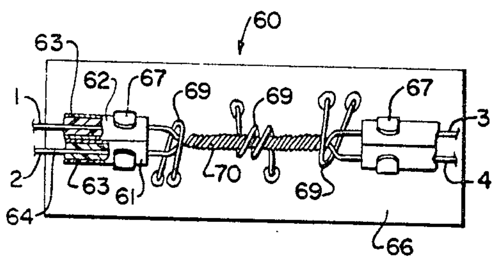
FIG. 7
INVENTORS
JOSEPH D. CAPPUCCI
HAROLD SEIDEL
BY Darby & Darby
ATTORNEYS United States Patent Office 3,452,301

Patented June 24, 1969

3,452,301

LUMPED PARAMETER DIRECTIONAL COUPLER

Joseph D. Cappucci, Wayne, and Harold Seidel, P.O. Martinsville, Warren Township, N.J., assignors to Merrimac Research and Development, Inc., Irvington, N.J., a corporation of New York Filed Feb. 15, 1966, Ser. No. 527,421
Int. Cl. H01p 5/14
U.S. Cl. 333—10 14 Claims

ABSTRACT OF THE DISCLOSURE

A four port directive quadrature coupler for controlled response over a band of frequencies having one or more coupler sections in which each coupler section possesses electrical symmetry with respect to at least one axis, the coupler section being formed by a pair of conductors whose ends provide the input and output ports for the section, the conductors being held in registration in a magnetic coupling relationship and having a length substantially less than one quarter wavelength long at a given center frequency of operation for the section to form a lumped constant element at that frequency. The inductance parameter of the pair oaf registered conductors and the capacitance of the section, which is formed in major part by the proximity capacitance between the two conductors is such that the normalized input impedance of the odd mode bisection and the normalized input admittance of the even mode bisecting are substantially equal.

This invention relates to devices for coupling radio frequency energy and more particularly to couplers constructed in accordance with imposed conditions of duality designed for operation in the higher radio frequency ranges.

In the copending application of Joseph D. Cappucci, Ser. No. 478,930, filed on Aug. 11, 1965 and assigned to the same assignee, radio frequency coupling devices are disclosed which utilize symmetrical networks formed by lumped constant parameters. The values of the various parameters forming the couplers of that application are selected in accordance with certain imposed criteria of network input impedance and admittance to produce decidedly advantageous coupling results.

While the aforesaid couplers are fully operative and useful, they have limitations on their frequency of operation due to the use of the lumped constant parameters. Accordingly, the couplers of the present invention are constructed in a manner to overcome these limitations and are designed to operate at the higher radio frequencies, e.g. up to about 15,000 megacycles.

In accordance with the present invention, radio frequency energy coupling devices are provided which are relatively simple to construct and have desired isolation, input match, coupled output, energy transmission and frequency responsive characteristics. These couplers are constructed as symmetric networks from twisted wire pair sections whose normalized inductance and capacitance values are selected in accordance with conditions of duality imposed upon the network. In the preferred embodiment of the invention the duality condition is that the normalized input impedance of the even mode bisection of the network equals the normalized input admittance of the odd mode bisection.

It is therefore an object of the present invention to provide coupling devices formed by symmetrical networks using twisted wire pair sections having imposed conditions of duality.

An additional object is to provide coupling devices formed by symmetrical networks of twisted wire pair sections and having desired coupling properties which are constructed using imposed conditions of duality in which the normalized input impedance of the even mode equivalent circuit bisection of the network is equal to the normalized admittance of its odd mode equivalent circuit bisection.

Another object is to provide devices for coupling radio frequency energy using twisted wire pair sections in which the values of the inductance and capacitance of a section at a particular frequency of operation are selected in accordance with imposed conditions of duality.

Other objects and advantages of the present invention will become more apparent upon reference to the following specification and annexed drawings in which: FIG. 1 shows a four terminal symmetric coupler network; FIG. 2 is a schematic diagram of a four terminal symmetric coupler network formed of two twisted wire pair sections; FIGS. 3A and 3B respectively are the odd mode and even mode bisection equivalent circuits for the coupler of FIG. 2; FIG. 4 is a schematic diagram of a coupler with one twisted pair wire section; FIG. 5 is a schematic diagram of the bisection of the coupler of FIG. 4; FIGS. 6A and 6B are the even and odd mode equivalent circuits of the bisection of FIG. 5; FIG. 7 is a bottom view of a coupler with one twisted wire pair section; and FIG. 8 is a bottom view of a coupler with two twisted wire pair sections.

FIGURE 1 shows in general block notation a symmetric four terminal network 10 of the type to be considered having components (not shown) which are frequency responsive to change their impedances and admittances. The symmetric network has four ports 1, 2, 3 and 4 and is of the type such that when an input signal is applied to port 1, a coupled output signal is produced at port 2, a transmitted output signal produced at port 3 in phase quadrature with the input signal at port 1, and port 4 is isolated so that no output signal appears thereon. Many such networks are well known in the art.

Since network 10 is symmetrical it can be analyzed, according to one theory, about a plane of symmetry 12, in terms of even mode and odd mode bisections of the networks and their equivalent circuits. By imposing a condition of duality on the network 10 such that $Z_{in_e}=Y_{in_o}$, where $Z_{in_e}$ is the normalized input impedance for the even mode bisection of network 10 (where the normalized input impedance equals the input impedance of the network at any one frequency divided by the characteristic input impedance of the network) and $Y_{in_o}$ is the normalized input admittance for the odd mode bisection of network 10 (where the normalized input admittance equals the input admittance at a specific frequency multiplied by the characteristic input admittance of the network) it can be shown by network analysis that the scattering coefficients for the symmetric network 10 are (1) $$S_{11}=0$$

(2) $$S_{12}=V\Gamma_e$$

(3) $$S_{13}=V[1-\Gamma_e^2]^{1/2}$$

(4) $$S_{14}=0$$

Where V is the input voltage and $\Gamma_e$ is the reflection coefficient in the even mode bisection.

With an input V to port 1, Equations 1 through 4 completely define the symmetric network 10 of FIG. 1 as a directional coupler having the following characteristics:

(a) Isolation (between ports 1 and 4)—since $S_{14}=0$ there is no signal transmission between ports 1 and 4.
(b) Input match (at port 1)—since $S_{11}=0$ there is no mismatch at the port 1 input.

(c) Coupled output (between ports 1 and 2) of $\Gamma_e$—since $S_{12}=V\Gamma_e$ defines the coupling between ports 1 and 2, (d) Transmission (between ports 1 and 3) of $$[1-\Gamma_e^2]^{1/2}-S_{13}=V[1-\Gamma_e^2]^{1/2}$$

defines the transmission between ports 1 and 3.

Additionally, due to the frequency responsive characteristics of the components of the network, the coupled output at port 2 can be shown to be in phase quadrature with the transmitted output at port 3. All of the foregoing is described in detail in the aforesaid co-pending application.

All of the above desired characteristics are produced in the couplers of the present invention using imposed duality conditions with a pair of conductors held in registration to achieve a mutual coupling effect, for example, by twisting the conductors around each other. By suitable selection of the wire size for the conductors and coupling, e.g. number of twists per unit length, desired values of inductance and capacitance are produced which are used to form relatively simple coupling devices having desired coupling properties over a range of frequencies. Such couplers made according to the present invention are particularly useful at higher frequencies.

FIGURE 2 shows in schematic form a symmetric network coupler 15 made in accordance with the invention. Coupler 15 has two sections of twisted wire line 20–1 and 20–2. Each of the sections 20 is formed, for example, by ordinary enameled (insulated) copper wire of a predetermined size which is twisted together. The construction of typical sections 20 is described in greater detail below. Each section 20 of FIG. 1 has a length R such that the ratio of the total inductance per unit length L to the capacitance per unit length $c$ is equal to the square of the characteristic impedance of the network. This is stated as:

$$\frac{L}{C}=Z_0^2 \qquad (5)$$

Each wire of section 20–1 is joined to a wire of section 20–2 by the center conductor of a respective transmission line 22–1 or 22–2. The two transmission lines 22 each have an electrical length $\theta$ (given in degrees at a particular wavelength) and are uncoupled from each other (no transfer of energy). They also have the same characteristic impedance as the coupler 15 so that their normalized input impedance $z=1$. The transmission lines 22 have substantially no inductive coupling between themselves or between either of the twisted wire sections 20–1 or 20–2.

In (5) the capacitance C is the capacitance between the twisted wires of each section 20. The quantity 1 for each section 20 is given as:

$$1=2L_s-\frac{L_a}{2} \qquad (6)$$

This is obtained in the following manner. In any pair of twisted wires, such as a section 20, the odd, or antisymmetric, mode inductance is less than the even, or symmetric, mode inductance. This is so because in the odd mode most of the electromagnetic field is contained between the wires while the even, or symmetric inductance remains large. The odd mode inductance $L_o$ of a twisted pair is measured as a series connection of the pair of wires, each having an inductance $L_a$, forming the section. Since the wires each of inductance $L_a$ are connected in series, the total odd mode inductance $L_o$ equals $1/2L_a$. The even mode inductance $L_e$ is measured as a shunt connection of two wires each having an inductance $L_s$, so that $L_e=2L_s$. The total quantity 1 is the sum of the even and odd mode inductances, as in (6), with the odd mode having a minus sign since it is anti-symmetric.

FIGS. 3A and 3B respectively are the even and odd mode equivalent circuits of the bisection of the symmetrical network coupler 15 about its plane of symmetry 12. Since the even mode bisection plane 12 is an open circuit plane, the capacitance C between the twisted wire pair sections 20 does not appear in the even mode equivalent circuit bisection of FIG. 3A. In the odd mode bisection equivalent circuit of FIG. 3B, where the bisecing plane 12 is an open circuit plane, the inductance 1 does not appear and the value of the inter-wire capacitance is 2C (two capacitors of value 2C in series give a value C). In all of the foregoing and following analysis it is assumed that the network is terminated in its characteristic impedance.

In FIG. 3A, the inductor 40 of value X represents the normalized reactance of the even mode bisection of the twisted wire pair and in FIG. 3B the capacitor 42 of value $b$ represents the normalized susceptance of the odd mode bisection of the twisted wire pair. Thus, from (6) if $$1=2L_s-\frac{L_a}{2}$$

then $$X=\frac{\omega}{Z_o}\left(2L_s-\frac{L_a}{2}\right) \qquad (7)$$

Since the inter wire capacitance of the odd mode is 2C, then $$b=Z_o\omega(2C) \qquad (8)$$

for the odd mode bisection.

In most cases the effect of the odd mode antisymmetric inductance $L_a/2$ can be neglected, since it is quite small. Where it is necessary to compensate for the effects of the $L_a/2$ inductance, a small shunt capacity can be added to ground at each port of the coupler making an L section type filter of the proper characteristic impedance. Neglecting $L_a/2$, then (7) can be rewritten as:

$$X=\frac{\omega 1}{Z_o} \qquad (9)$$

where $$1=2L_s$$

The loss function L of the even mode equivalent of FIG. 5A can be shown to be:

$$L=1+\left(\frac{\Delta}{2}\right)^2 \qquad (10)$$

where $$\Delta=2X\cos\theta-X^2\sin\theta \qquad (11)$$

The function $\Delta$ is derived from a matrix analysis of a series element X, here 40–1, a connecting transmission line section, 22, and another series connected element X, 40–2. From $$X=\frac{\omega 1}{Z_o}=k_1\omega \qquad (12)$$

and $$\theta=\frac{2\pi d}{\lambda}=k_2\omega \qquad (13)$$

where $d$ is the physical length of a transmission line section 22 and $\lambda$ is the operating wavelength of the input signal.

The derivative of the loss function L with respect to ($dL/d\omega$) can be obtained and by setting this derivative equal to zero:

$$\frac{dL}{d\omega}=0 \qquad (14)$$

We can obtain the point where L is stationary with respect to $\omega$.

Inserting (12) and (13) into (14) gives X as a function of $\theta$ which can be shown to be $$X=2\frac{1-\theta\tan\theta}{\theta+2\tan\theta} \qquad (15)$$

Equation 15 gives information for a plot of X vs. $\theta$ while (10) and (11) give information for a plot of L vs. $\theta$. This gives all the necessary parameters to design a coupler. Having the required value of coupling for the coupler, where coupling is defined as $$\left(\frac{L-1}{L}\right)$$

and L is the loss function, $\theta$ for a transmission line section 22 is determined from the L vs. $\theta$ plot. Using this value of $\theta$, X is determined from the X vs. $\theta$ plot. Knowing X, the characteristic impedance $Z_o$ of the coupler and $\omega$, the frequency of operation, 1 is determined from (9).

Once 1 is known, then for the imposed condition of duality where $X=b$ (or $Z_{in_e}=Y_{in_o}$), then $$\frac{\omega 1}{Z_o}=Z_o\omega(2C) \tag{16}$$

from which C is easily determined. It is then a simple matter to make a twisted wire pair section with the desired total inductance 1 and total capacitance C. The inductance 1 is a function of wire diameter and length of wire while the capacitance C is a function of the tightness of the twist used to produce the inter-wire capacitance.

FIG. 4 shows a symmetrical network 50 formed of only one twisted wire pair section 52. The analysis for this network is similar to that presented for FIGS. 2 and 3. Since network 50 is symmetrical, it can be bisected along its plane of symmetry 12 to give FIG. 5. The capacitor 53 of value 2C represents half of the total inter-wire capacitance. Resistor 55 designates the terminating impedance of the network, and has a value of one (1) unit. The value L for the inductance 55 equals the inductance of the twisted wire pair in the half of the network encompassed by the bisecting plane 12.

FIG. 6 shows the even mode equivalent of the bisection circuit of FIG. 5. Since bisecting plane 12 is an open circuit plane for the even mode, the capacitor 53 has no effect and the inductance 55 is the high value even mode inductance $L_e$.

The odd mode equivalent circuit for the bisection is shown in FIG. 6B. Since the bisecting plane 12 is considered to be a short circuit plane in the odd mode, capacitor 53 of value 2C is in parallel with the output impedance 55. The wire pair inductance is neglected since it is very small in the odd mode, as explained above.

For the even mode equivalent circuit of FIG. 6A, the normalized input impedance is:

$$Z_{in_e}=1+\frac{jwL_e}{Z_o} \tag{17}$$

Since $L_e=2L_s$ in the even mode, then:

$$Z_{in_e}=1+j\frac{w2L_s}{Z_o}=1+jX \tag{18}$$

For the odd mode equivalent circuit of FIG. 6B the normalized input admittance is $$Y_{in_o}=1+jZ_ow(2C)=1+jb \tag{19}$$

Imposing the duality condition on the network of FIG. 4 that its normalized input impedance for the even mode bisection equals its normalized input admittance for the even mode bisection gives from Equations 18 and 19;

$$Z_ow(2C)=\frac{w(2L_s)}{Z_o} \tag{20}$$

or $$\frac{L_s}{C}=Z_o^2 \text{ so that } X=b \tag{21}$$

The coupling $k$ in db between ports 1 and 2 of the coupler of FIG. 4 is given as:

$$k=10\log\left|\frac{1}{S_{12}}\right|^2=10\log\frac{4+X^2}{X^2}=10\log\left|1+\frac{4}{X^2}\right| \tag{22}$$

The transmission loss L in db between ports 1 and 3 is given by:

$$L=10\log\left|\frac{1}{S_{13}}\right|^2=10\log\left(\frac{4+X^2}{4}\right)=10\log\left(1+\frac{X^2}{4}\right) \tag{23}$$

This completely defines the coupler. Given the coupling value $k$ or loss value L necessary, Equation 22 or 23 is used to solve for X which, from Equation 21, is equal to $b$. For any predetermined frequency of operation and input impedance level having the value of X, the total inductance $L_S$ can be determined from which a twisted wire pair of total inductance 1 can be wound. The same holds true for the inter-wire capacitance which is gotten from 19.

To illustrate the design of a coupler according to the subject invention consider that a 3 db (loss value L) 50 ohms ($Z_o$) coupler is to be designed with a center frequency of operation of 30 mc. From Equation 23

$$\log 10\left(1+\frac{X^2}{4}\right)=3$$

or $$1+\frac{X^2}{4}=2$$

$$X^2=4$$

$$X=2$$

Since, from 21, $X=b$, then the symmetric inductance $l$ from 16 is $$l=\frac{XZo}{w}$$

from which for the values of 30 mc. and 50 ohms $$l=.5305\ \mu h$$

from Equation 20, since $2Ls=l$, the anti-symmetric capacity is $$C=106.1\ \mu\mu f$$

The physical coupler of this example was constructed by taking #28 polyurethane coated wire for each of the two conductors. Approximately 177 twists were made over a length of six inches, the two conductors having a total overall length of 7.3 inches including lead end length. The two regestered conductors were wrapped on a quarter inch diameter mandrel as a single helical coil, the coil having a length of about ½ inch.

As can be seen from above, the coupler constructed in accordance with the present invention has length of registered wire which is considerably less than one quarter wavelength at the center of the operating frequency band (30 mc.). At a frequency of 30 mc. a quarter wavelength in air is 98.42 inches. Thus, the coupler is a lumped constant device. If the registered conductors are kept in an elongated position, rather than winding them in a helix, then their length would be several times as great. However, they would still be considerably less than one-quarter wavelength long thereby satisfying the criteria of a lumped constant device.

FIG. 7 shows a coupler 60 made in accordance with the invention having a single twisted wire pair section. A pair of electrically conductive tubes 61, 62 each has a central core of insulation 63 with an insulated wire 64, for example an enameled wire, passing therethrough. The tubes 61, 62 are held to a conductive plate 66 by clamps 67 and the wires 64 from both tubes extending beyond the tubes are of the desired size and twisted in section 70 achieve a desired inductance and inter-wire capacitance for a particular operating frequency and coupling. A similar pair of tubes 61, 62 complete the coupler. The four ports 1–4 are as shown.

In constructing coupler 60, the desired value of inter-wire capacitance cannot always be achieved within the limits of the design for a particular wire size and twist. To obtain the necessary capacitance, loops of wire 69 can be placed over the twisted section at selected points to increase the capacity of the section. Since both ends of a loop are connected to the plate 66, the loop does not contribute any inductance to the section. The spacing and the number of loops 69 are selected to obtain the desired capacity.

FIG. 8 shows a two section coupler 90 with four insulated terminals **92*a*–92*d* mounted on an electrically conductive base plate 93. Coaxial or other type connectors (not shown) may be used on the reverse side of the plate having the grounded portion thereof connected to the plate and the center terminal connected to a respective conductive terminal 95*a*–95*d*. A pair of metallic tubes 96 and 97 are electrically connected to the base plate 93. Each tube has an insulated core through which passes a respective straight wire 98 and 99. The wires 98 and 99 are twisted on each end of the tubes to form the twisted pair sections 100–1 and 100–2 and the end of each wire is connected to a respective terminal 95. The transmission line section corresponding to 22 of FIG. 2, are the portions of the wires within tubes 98 and 99**. If needed, loops (not shown) can be wrapped around the twisted wire section to provide additional capacitance like in FIG. 7.

While only one and two section coupler devices have been described, it should be understood that devices having a larger number of sections, such as three or more, can be constructed using the analytical principles set forth herein for the imposed conditions of duality. Of course, the operating bandwidth of a coupler generally increases with an increase in the number of sections.

While preferred embodiments of the invention have been described above, it will be understood that these are illustrative only, and the invention is limited solely by the appended claims.

What is claimed is:

1. A four port directive quadrature coupler for controlled response over a band of frequencies, said coupler possessing electrical symmetry with respect to at least one axis, said coupler comprising:

a pair of conductors held together in registration in a magnetically coupled relationship, said pair of conductors being substantially less than one quarter wavelength long at the center of the operating band of frequencies to form a lumped constant element over said band of frequencies of operation having an inductance parameter L when exicited in parallel with their mutual ends joined and a proximity capacitance parameter between them, each end of said pair of conductors forming a respective port of the coupler, the normalized input impedance of the odd mode bisection and the normalized input admittance of the even mode bisection being substantially equal such that $$Z_o=\sqrt{\frac{L}{C}}$$

where $Z_o$ is the characteristic impedance of the coupler and C is the capacitance which is formed in major part by the proximity capacitance.

2. A coupler as in claim 1 wherein the inductance parameter of the coupler is selected by the effective length and the effective cross-section of the conductors and the capacitance parameter by the spacing between the conductor pair.

3. A coupler as in claim 1 wherein the two input ports comprise an end of each of the conductors and the output ports comprise the other end of each of the conductors.

4. A coupler as in claim 1 wherein the length of the registered pair of conductors is in the range of one tenth wavelength or less at the center frequency of operation.

5. A coupler as in claim 1 wherein the conductors comprise a pair of wires and the wire pair is held in registration by being twisted together.

6. A coupler as in claim 5 wherein the inductance parameter of the twisted wire pair is selected by wire diameter and length and the capacitance parameter by the tightness of the wire pair twist and the thickness and constant of the dielectric coating.

7. A coupler as in claim 1 further comprising capacitance means external to said pair of conductors for coupling both conductors to a reference potential plane to compensate for leakage reactance.

8. A coupler as in claim 6 further comprising capacitance means external to the pair of twisted wires for coupling both wires of said pair to a reference potential plane to compensate for leakage reactance.

9. A four port directive quadrature coupler for controlled response over a band of frequencies, said coupler possessing electrical symmetry with respect to at least one axis, said coupler comprising:

a plurality of four port directive coupler sections, each of said sections having a pair of conductors held together in registration in a magnetically coupled relationship, said pair of conductors being substantially less than one quarter wavelength long at the center of the operating band of freqeuncies to form a lumped constant element over said band of frequencies of operation having an inductance parameter L when excited in parallel with their mutual ends joined and a proximity capacitance parameter between them, each end of said pair of conductors forming a respective port of the coupler the normalized input impedance of the odd mode bisection and the normalized input admittance of the even mode bisection being substantially equal such that $$Z_o=\sqrt{\frac{L}{C}}$$

where $Z_o$ is the characteristic impedance of the coupler and C is the capacitance which is formed in major part by the proximity capacitance, and means for connecting said sections in cascade between the output ports of one section and the input ports of a next succeeding section while preserving the said symmetry and normalized impedance and admittance relationship for the entire coupler.

10. A coupler as in claim 9 wherein said connecting means between a pair of cascaded sections comprises a pair of uncoupled transmission lines.

11. A coupler as in claim 9 wherein the inductance parameter of each said coupler section is selected by the effective length and the effective cross-section of the conductors and the capacitance parameter by the spacing between the conductor pair.

12. A coupler as in claim 9 further comprising capacitance means external to the conductors of said sections for coupling the conductors of selected ones of said sections to a reference potential plane to compensate for leakage reactance.

13. A coupler as in claim 9 wherein the conductors comprise a pair of wires and the wire pair is held in registration by being twisted together.

14. A coupler as in claim 13 further comprising capacitance means external to the conductors of said sections for coupling the conductors of selected ones of said sections to a reference potential plane to compensate for leakage reactance.

References Cited

UNITED STATES PATENTS

| | | | |
|---|---|---|---|
| 3,237,130 | 2/1966 | Cohn | 333—10 |
| 3,319,190 | 5/1967 | Shively et al. | 333—10 |

FOREIGN PATENTS

| | | |
|---|---|---|
| 1,146,559 | 4/1963 | Germany. |

ELI LIEBERMAN, *Primary Examiner.*

M. NUSSBAUM, *Assistant Examiner.*

U.S. Cl. X.R.

333—24

UNITED STATES PATENT OFFICE
CERTIFICATE OF CORRECTION

Patent No. 3,452,301 June 24, 1969

Joseph D. Cappucci et al.

It is certified that error appears in the above identified patent and that said Letters Patent are hereby corrected as shown below:

Column 3, line 3, should appear as shown below:

(d) Transmission (between ports 1 and 3) of $[1-\Gamma_e^2]^{1/2}$ line 4, should appear as shown below:

$$S_{13}=V[1-\Gamma_e^2]^{1/2}$$

line 51, "quantity 1 for" should read -- quantity $\ell$ for --; equation (6), should appear as shown below:

$$\ell=2L_s-\frac{L_a}{2}$$

same column 3, line 69, "quantity 1" should read -- quantity $\ell$ -- Column 4, line 5, "inductance 1" should read -- inductance $\ell$ -- line 18, the equation should appear as shown below:

$$\ell=2L_s-\frac{L_a}{2}$$

same column 4, equation (9), should appear as shown below:

$$X=\frac{\omega\ell}{Z_o} \quad \text{where} \quad \ell=2L_s$$

Column 5, line 14, "Once 1" should read -- Once $\ell$ --; lines 22 and 23, "inductance 1", each occurrence, should read -- inductance $\ell$ --.

Signed and sealed this 25th day of May 1971.

(SEAL)
Attest:

EDWARD M. FLETCHER, JR.
Attesting Officer

WILLIAM E. SCHUYLER, JR
Commissioner of Patents